March 8, 1960     E. L. HAYDEN ET AL     2,927,594
FLO-MIX UNIT

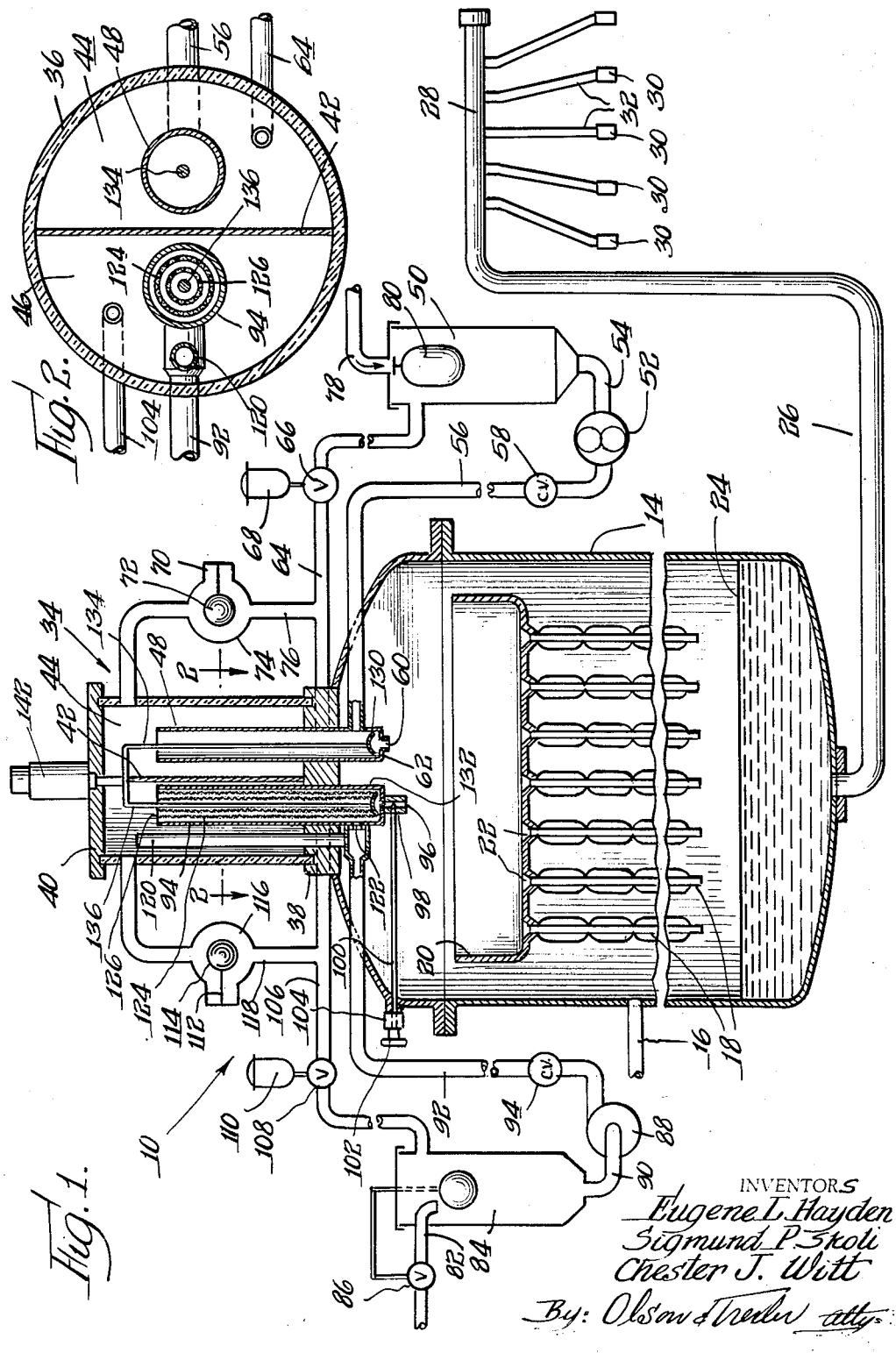

Filed Oct. 31, 1957     2 Sheets-Sheet 2

INVENTORS.
Eugene L. Hayden
Sigmund P. Skoli
Chester J. Witt
By: Olson & Trexler
Attys.

United States Patent Office 2,927,594
Patented Mar. 8, 1960

2,927,594
FLO-MIX UNIT

Eugene L. Hayden, Chicago, Sigmund P. Skoli, Elmwood Park, and Chester J. Witt, Deerfield, Ill., assignors to Mojonnier Bros. Co., Chicago, Ill., a corporation of Illinois Application October 31, 1957, Serial No. 693,611

8 Claims. (Cl. 137—115)

The present invention relates to a novel apparatus for mixing fluids together, and more particularly to a novel apparatus for obtaining a fluid mixture having substantially predetermined proportions of the desired fluids.

While various uses for certain features of the present invention may suggest themselves, the novel apparatus is particularly suitable for use in connection with the preparation of carbonated beverages and the like when it is desired to obtain a predetermined mixture of a syrup and water. In order to facilitate the present disclosure, the features of the present invention will be described with particular reference to their use in connection with a beverage preparing apparatus.

In heretofore proposed apparatus of the general type contemplated herein, considerable difficulties have been encountered in that the proportions of the syrup and water may vary whereby the end product is not of uniform quality. Heretofore proposed attempts to solve this difficulty have, in many cases, resulted in relatively complicated and unduly expensive equipment. It is an important object of the present invention to provide a novel apparatus for mixing a plurality of fluids, by which apparatus the proportions of the various fluids in the mixture may be accurately controlled.

A more specific object of the present invention is to provide a novel apparatus of the above described type which is of relatively simple construction and may be easily and economically manufactured and operated.

Still another object of the present invention is to provide a novel apparatus which will automatically function continuously to provide a predetermined mixture of a plurality of fluids regardless of any slight variations in the rate of delivery of the fluids from sources of supply.

Other objects and advantages of the present invention will become apparent from the following description and the accompanying drawings wherein:

Fig. 1 is a somewhat diagrammatic partial sectional view showing an apparatus incorporating features of the present invention;

Fig. 2 is an enlarged cross sectional view taken along line 2—2 in Fig. 1; and

Figure 3:
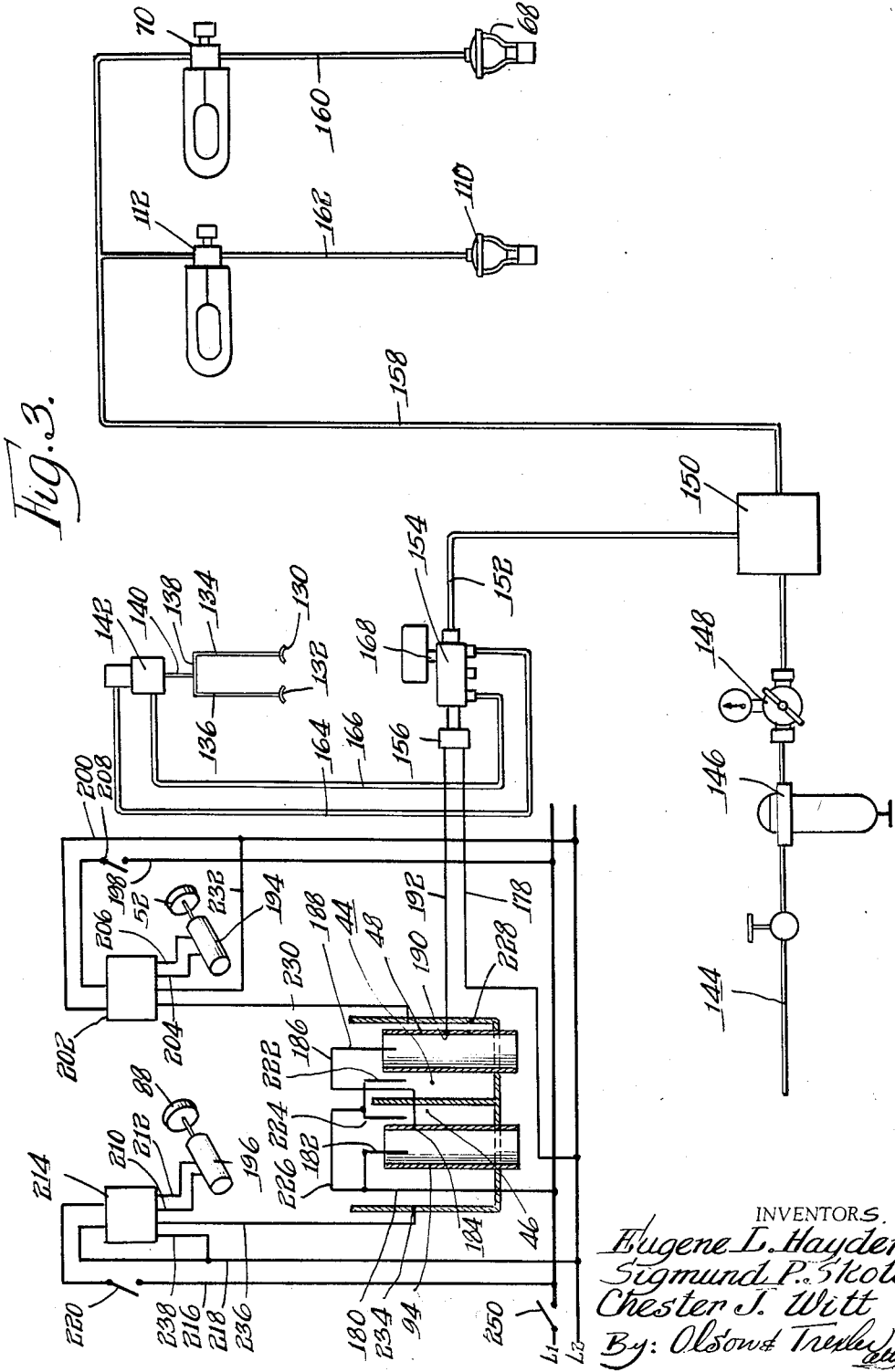
Fig. 3 is a diagrammatic view showing control means for the apparatus of the present invention.

Referring now more specifically to the drawings wherein like parts are designated by the same numerals throughout the various figures, an apparatus 10 is shown for the purpose of illustrating the present invention, which apparatus is of the type adapted to process and cool a beverage for subsequent dispensing. The apparatus includes a pressure tank 14 in which carbon dioxide under superatmospheric pressure is maintained for the purpose of carbonating the beverage. Any suitable source of gas under pressure, not shown, is connected to the interior of the pressure tank by means of a conduit 16. Cooling coils 18 are mounted within the pressure tank and are a portion of a suitable refrigerating system, the remainder of which is not shown. A pan 20 is mounted above the cooling coils for collecting syrup and water which are supplied in predetermined portions in the manner described below, and this pan has apertures 22 formed in the bottom thereof at the upper margins of each of the cooling coils. As a result the liquid in the pan will flow downwardly over the cooling coils in the form of thin films. This causes cooling of the liquid and also presents the liquid to the carbon dioxide atmosphere within the pressure tank in a manner which accomplishes carbonation of the liquid. The cooled and carbonated beverage or liquid mixture 24 collects at the bottom of the tank 14 from where it is delivered to any suitable point of discharge. In the embodiment shown, a conduit 26 is provided for directing the cooled and carbonated liquid mixture to a manifold 28 from which the liquid is directed to a plurality of container filling heads 30 through branch conduits 32.

In accordance with the present invention, the apparatus 10 is provided with means 34 for accurately controlling the delivery of the various liquids into the pressure tank. This means includes a cylindrical head member 36 having a lower end secured and sealed to a base member 38 mounted in the top of the pressure tank. The upper end of the head member is closed by a top plate 40, and a partition 42 is provided within the head member so as to form two independent reservoirs 44 and 46.

A vertically disposed tube 48 is located within the reservoir 44 and extends downwardly through the base member 38 and into the pressure tank 14. The beverage syrup or any other desired fluid is supplied to the tube 48 from a tank 50 by means of a pump 52. The pump 52 is preferably a positive displacement type pump and has an inlet connected with the bottom of the tank 50 by a pipe 54 and an outlet connected with a lower end portion of the tube 48 by a pipe 56. Since the interior of the pressure tank 14 is maintained under a superatmospheric pressure, a one way check valve 58 is provided in the pipe 56 for preventing reverse flow of the fluid in the pipe in the event the pump 52 is stopped. An orifice 60 is accurately formed to a predetermined size in a plate member 62 traversing and substantially closing the lower end of the tube 48, through which orifice the liquid or syrup is discharged from the tube and into the pressure tank. In order to maintain the flow of syrup or liquid through the orifice 60 at a predetermined constant rate, a constant head of liquid or in other words a column of liquid of constant height is maintained above the orifice 60. This is accomplished by correlating the output of the pump 52 with the size of the opening or orifice 60 so that the pump delivers a volume of fluid in excess of the volume of fluid which can flow through the orifice 60 when a maximum column of fluid is maintained in the tube 48 or in other words when the tube is full and overflowing. Thus the tube 48 is maintained in a constantly overflowing condition and the liquid which overflows is collected in the reservoir 44.

An outlet pipe 64 is connected with the bottom of the reservoir 44 and with the top of the tank 50 for returning the overflow liquid to the tank. An air actuated valve 66 is provided in the conduit 64 for preventing communication between the reservoir and the tank unless the conduit is filled with the liquid. The air actuating means 68 of the valve is controlled by a float valve 70 having a float element 72 disposed in a chamber 74 connected to the pipe 64 by an upstanding conduit 76. The air valve 72 thus serves to maintain control over the height of the liquid in the reservoir 44. The tank 50 normally receives syrup or liquid from a suitable source of supply, not shown, through a conduit 78 entering the upper end of the tank, and a float valve 80 for closing the conduit 78 when the tank 50 is filled.

The means for supplying water or liquid to the pressure tank is similar to that described for supplying syrup. More specifically, water is directed from a suitable source of supply, not shown, through a conduit 82 and into a tank 84, which conduit is controlled by a float valve 86. A pump 88 which is preferably a centrifugal type pump has an inlet connected by pipe 90 to the bottom of the tank 84 and an outlet connected to conduit 92 in which there is disposed a one way check valve 94 for preventing reverse flow of fluid in the conduit 92. The conduit 92 is connected with the lower end portion of a tube 94 which extends through the base 38 and to the reservoir 46. A restricted orifice 96 is provided at the lower end of the tube 94 for controlling the flow of water into the pressure tank. This orifice differs from the corresponding orifice 60 described above in that it is provided in a valve block 98 into which a needle valve 100 extends for controlling the effective size of the orifice 96 and thereby adjusting the flow of fluid through the orifice. The needle valve 100 may be turned for adjusting purposes by means of a hand knob 102 at its outer end, and it is provided with a threaded stem portion cooperable with a fixed internally threaded member 104 so that upon turning it is axially adjusted. A constant head of liquid is maintained in the tube 94 by causing the water continuously to overflow the tube, and the overflow of liquid is returned to the tank 84 through a conduit 106 having a valve 108 connected therein and controlled by air actuator 110. The actuator means 110 is in turn controlled by a valve 112 actuated by float 114 in a chamber 116 connected to the conduit 106 by pipe 118.

While a positive displacement type pump could be used for the pump 88, this pump is, as mentioned above, preferably a centrifugal type pump since the volume of water to be supplied to the pressure tank greatly exceeds the volume of syrup and a centrifugal pump is more economical. In order to obtain reliable operation of the centrifugal pump, it is necessary that the pump be operated so as to deliver a volume of liquid at a rate greatly in excess of the rate at which the same volume of liquid can be discharged through the restricted orifice 96. It has been found that when the full amount of a liquid delivered from the centrifugal pump is directed into the tube 94, a turbulence is created within the tube which will adversely affect the uniform rate of fluid discharge through the orifice 96. In order to reduce this turbulence a substantial portion of the liquid from the pump 88 is bypassed around the tube 94 and this is accomplished by providing an upstanding overflow tube 120 connected to the pipe 92 and extending into the reservoir 46. In addition a restricted orifice 122 is provided between the pipe 92 and the tube 94 which orifice is correlated with the orifice 96 so that the water or liquid may be delivered into the tube 94 at a rate only slightly in excess of the rate at which it may be discharged from the orifice 96. For example, the orifice 122 may be formed so that fluid will be delivered into the tube 94 at a rate about five percent greater than it can be discharged through the orifice 96. It has been found that the adverse effect of turbulence can be further reduced and substantially eliminated by providing one or more tubular screens 124 and 126 within the tube 94 and between the orifices 122 and 96 as shown in Figs. 1 and 2. These screens serve as baffles to reduce or eliminate turbulent flow in the tube 94. As will be understood, the volume of syrup is very small as compared with the volume of water used for preparing the beverage and therefore there is little or no turbulent flow in the tube 48 which will adversely affect the uniform rate of the syrup flow through the orifice 60. It is to be understood however that cylindrical baffles or screens could be provided in the tube 48 and that an overflow tube and restricted orifice corresponding to the tube 120 and orifice 122 could be associated with the tube 48 and the pipe 56 in the event the rate of fluid flow through the pipe 56 and tube 48 is to be increased sufficiently to cause undesirable turbulence.

Referring particularly to Fig. 3, control means will now be described which serve to insure that the apparatus will deliver only a properly proportioned mixture of the fluids. This means includes valve members 130 and 132 (see also Fig. 1) which are respectively disposed in the tubes 48 and 94 for selectively closing and opening the discharge orifices 60 and 96. The valve members 130 and 132 are secured to legs 134 and 136 of a yoke member 138 which in turn is connected to and actuated by a piston rod 140 associated with an air cylinder 142. Air under pressure is directed to the cylinder 142 in a controlled manner so that when liquid is overflowing both of the tubes 48 and 94 the piston rod and thus the valve members are raised and when the liquid falls below the overflow level in either one or both of the tubes 48 and 94 the valve members are lowered to close the discharge orifices. More specifically, air under pressure is directed from a suitable source of supply, not shown, through a conduit 144 and through a pressure regulator 146 and pressure gauge 148 to a manifold 150. One outlet port of the manifold 150 is connected by conduit 152 to an inlet port of a control valve 154 adapted to be actuated by a solenoid 156. Another outlet port of the manifold 150 is connected by a conduit 158 and branch conduits 160 and 162 to the valve actuators 68 and 110. The float operated control valves 70 and 112 are respectively connected in the conduits 160 and 162.

The control valve 154 has a pair of ports respectively connected with opposite ends of the cylinder 142 by conduits 164 and 166. The control valve may be of any known construction which is adapted to connect the conduit 166 with the conduit 152 and the conduit 164 with the vent opening 168 so as to raise the valve members 130 and 132 when the solenoid is energized. The structure is also such that when the solenoid 156 is deenergized the conduits 164 and 166 are respectively connected with the conduit 152 and the vent 168. In order to control operation of the solenoid 156, one terminal of the solenoid is connected by wire 178 with a power line L2 and the other terminal of the solenoid is connected with the power line L1 through circuit means which is adapted to be open when the liquid in either one or both of the tubes 48 and 94 falls below the desired predetermined level. This means includes a wire 180 connected with the power line L1 and connected to a probe 182 which extends into the tube 94. When the tube 94 is filled to the desired level or in other words is overflowing electrical contact is established between the probe 182 and a terminal element 184 secured to the tube through the liquid in the tube. A wire 186 connects the terminal element 184 and a probe 188 which extends into the tube 48. When the liquid is at the desired level in the tube 48 electrical contact is established between the probe 188 and a terminal element 190 which in turn is connected with the solenoid 156 by a wire 192. With this arrangement it will be appreciated that the circuit will be broken and the solenoid 156 will be deenergized whenever the liquid in either of the tubes 48 and 94 falls below the desired level. When this occurs the valve members 130 and 132 will be closed so that the two liquids cannot be discharged into the pressure tank in improper proportions.

The pumps 52 and 88 are normally continuously driven by electric motors 194 and 196 respectively. The motor 194 is connected with the power lines L1 and L2 by wires 198 and 200, a relay 202 and wires 204 and 206 extending from the relay. A control switch 208 is connected in the wire 198. The motor 196 is similarly connected with the lines L1 and L2 by means of wires 210 and 212 extending to a relay 214 which is connected to the power lines by wires 216 and 218. Another control switch 220 is connected in the wire 216. The relays are constructed so that when the control switches 208 and 220 are closed the motors will be energized, and the relays are further adapted to be energized in response to a signal supplied in the manner described below for stopping the motors. Stopping of the motors is desirable in order to prevent flooding of the chambers or reservoirs 44 and 46. In the event of a failure of any of the valves 66, 70, 108 and 112 in the liquid return systems such flooding might occur. In order to selectively energize the relays 202 and 214 to stop their associated motors in the event the liquid in the reservoirs 44 and 46 exceeds a predetermined level, electric probes 222 and 224 are connected with the power line 180 by a wire 226 and extend into the reservoirs 44 and 46 respectively. When the liquid in the reservoir rises above a predetermined level electrical contact is established between the probe 222 and a terminal element 228 in the reservoir 44, which terminal element is connected with one terminal of a control circuit in the relay 202 by a wire 230 which control circuit has another terminal connected with the wire 200 by a wire 232. When the liquid level in the reservoir 46 rises above a predetermined level, electrical contact is established between the probe 224 and a terminal element 234 which in turn is connected to the relay 214 by a wire 236. The control circuit of this relay has its other terminal connected with the wire 218 by a wire 238. It will be appreciated that the cylindrical head member 36, the partition 42 and the tubes 48 and 94 are constructed of any suitable dielectric material.

A brief resume of the operation of the above described apparatus is as follows. A master control switch 250 in the main power line L1 is first closed so that the control circuit associated with the air cylinder 142 will be energized to insure closing of the valves 130 and 132. Then the control switches 208 and 220 are closed to energize the pump motors so that liquid is charged into the tubes 48 and 94. When the liquid in these tubes reaches a desired predetermined level which is normally the overflow level, the probes 182 and 184 are contacted so that the solenoid 156 is energized and as a result the valves 130 and 132 are opened. The liquids in the tubes 48 and 94 then flow at predetermined constant rates through the orifices 60 and 96 so that a mixture having predetermined proportions of the liquids is provided in the pressure chamber 14. The mixture collecting in the pan 20 then flows in a plurality of thin films down the faces of the cooling coils for accomplishing cooling and carbonation of the mixture. Liquid overflowing the tubes 48 and 94 and the overflow tube 120 is returned to the tanks 50 and 84 under the control of the valves 66—70 and 108—112. The cooled and carbonated mixture collected at the bottom of the pressure tank 14 is finally removed through the conduit 26 and delivered to the filling heads 30 or to any other suitable means.

While the preferred embodiment of the present invention has been shown and described herein, it is obvious that many structural details may be changed without departing from the spirit and scope of the appended claims.

The invention is claimed as follows:

1. An apparatus for obtaining a mixture of a plurality of fluids in predetermined proportions comprising first means for retaining a column of liquid, second means for retaining a second column of liquid, first and second flow restricting means respectively connected with said first and second liquid column retaining means adjacent lower ends thereof and providing discharge openings, first and second valve means shiftable for opening and closing said flow restricting means, and means responsive to the level of liquid in said first and second liquid column retaining means for operating said valve means to open said first and second flow restricting means when the liquid in both of said column retaining means is at predetermined levels and for closing said first and second flow restricting means when the liquid in either of said column retaining means falls below a predetermined level.

2. An apparatus, as defined in claim 1, wherein said first and second column retaining means have overflow openings at upper ends thereof, said apparatus including first and second liquid supplying means respectively connected with said first and second column retaining means for supplying liquid to said first and second column retaining means at rates greater than the rates at which liquid may flow from said first and second column retaining means through said first and second flow restricting means respectively.

3. An apparatus, as defined in claim 2, which includes first and second reservoirs respectively associated with said first and second column retaining means for receiving liquid overflowing from said first and second column retaining means, each of said liquid supplying means including a supply tank, and first and second means including first and second valves for respectively returning overflow liquid from said first and second reservoirs to said tanks of the first and second liquid supplying means, and first and second means for controlling said valves and respectively responsive to liquid in said first and second mentioned reservoirs for operating said valves so as to maintain predetermined liquid levels in said reservoirs.

4. An apparatus, as defined in claim 3, wherein said first and second liquid supplying means include first and second pumps respectively for delivering fluid from said tanks to said first and second tubes, said apparatus including means associated with each of said reservoirs and responsive to liquid therein at a predetermined level for stopping the pumps for preventing overflowing of the reservoirs.

5. An apparatus, as defined in claim 2, which includes first and second means respectively disposed for collecting overflow liquid from said first and second column retaining means and for returning the overflow liquid to said first and second liquid supplying means, said first and second liquid supplying means respectively including first and second pumping means, and means responsive to the liquid levels in said first and second overflow collecting and returning means for stopping the pumping means in the event said last mentioned liquid levels exceed a predetermined level.

6. An apparatus of the type described comprising a pressure tank connectable with a source of gas under pressure, first and second upstanding tube means having lower end portions extending into an upper end of said tank, first and second means respectively at lower ends of the first and second upstanding tube means and providing flow restricting discharge openings of predetermined size, said first and second tube means having open upper ends, first and second liquid supplying means respectively connected with said first and second tube means for supplying liquids to said first and second tube means at rates greater than the rates at which the liquids may be discharged through said flow restricting openings whereby a portion of the liquid will overflow from said first and second tube means, and first and second means associated with said first and second tube means for collecting overflow liquid and returning such liquid respectively to said first and second liquid supplying means, one of said liquid supplying means including centrifugal pump means capable of delivering liquid at a rate substantially greater than the rate at which the liquid may be discharged from the discharge opening of the associated tube means, and means for bypassing a portion of the liquid delivered from said pump around said tube means associated with the pump for reducing turbulence within said last mentioned tube means.

7. An apparatus, as defined in claim 6, wherein at least one of said flow restricting means includes valve means for adjusting the effective size of its discharge opening.

8. An apparatus, as defined in claim 6, which includes baffle means within one of said tube means for reducing any possibility of turbulent flow within said one tube means which would unduly adversely affect flow of the liquid through the discharge opening of said one tube means.

References Cited in the file of this patent

UNITED STATES PATENTS

| 926,842 | Bartlett | July 6, 1909 |
| 1,276,315 | Best | Aug. 20, 1918 |
| 2,379,835 | Sisler | July 3, 1945 |

FOREIGN PATENTS

| 28,915 | Great Britain | Dec. 13, 1910 |